June 26, 1956     M. E. LAYTON ET AL     2,751,840

COOKING UTENSIL

Filed Jan. 22, 1953

INVENTORS
MARY ETTA LAYTON
BY & GILBERT ADAMEC

L. S. Saulsbury
ATTORNEY

United States Patent Office 2,751,840
Patented June 26, 1956

2,751,840

COOKING UTENSIL

Mary Etta Layton, Greensboro, N. C., and Gilbert Adamec, Bronx, N. Y.; said Adamec assignor to said Layton Application January 22, 1953, Serial No. 332,704

4 Claims. (Cl. 99—349)

This invention relates to a cooking utensil and more particularly to a utensil for frying bacon and eggs.

It is an object of the present invention to provide a cooking utensil for frying bacon and eggs wherein the bacon will be retained on raised portions in the bottom of the utensil and the top of the utensil will be hinged downwardly to compress the bacon strips upon the various depressions and hold them from shrinking and curling.

It is another object of the present invention to provide a cooking utensil formed of a bottom part and a top cover part which is of transparent glass adapted to be laid onto to the bacon strips and through which the bacon strips can be observed to see whether or not they are done or cooked to the desired degree.

It is another object of the invention to provide in a cooking utensil for frying bacon and eggs the proper removal of the grease from the bacon and the delivery of such grease to a space at one end of the bottom part for accumulation and use in the frying of the eggs.

It is another object of the invention to provide in a cooking utensil for cooking bacon and eggs side drains and openings through which the grease can be poured off the cooking utensil and closure members operable from the handle so that upon pulling a lever and tilting the vessel the excess grease can be poured out of the utensil.

It is another object of the invention to provide a cooking utensil having raised portions on which pieces of bacon can be spread with simple elevating means for extending the bacon strips to an elevated position after they have been cooked so that they may properly drain and be readily and easily accessible for removal from the tray.

Other objects of the invention are to provide a cooking utensil adapted for use in frying bacon and eggs and having the above objects in mind which is of simple construction, inexpensive to manufacture, has a minimum number of parts compact, easy to clean and maintain, of pleasing appearance, compact, rugged and durable, convenient and efficient in use.

For other objects and for a better understanding of the invention, reference may be had to the following detailed description taken in connection with the accompanying drawing, in which:

Figure 1 is a perspective view of the cooking utensil constructed according to one form of the invention with the cover or hold-down lid elevated;

Fig. 2 is a longitudinal sectional view taken on line 2—2 of Fig. 1;

Fig. 3 is a perspective view looking upon the bottom part of a modified form of the invention wherein there is provided hole means for registering drain openings at one side of the part and camming mechanism for operating the bacon lifters;

Fig. 4 is a fragmentary sectional view taken on line 4—4 of Fig. 3 and through the pouring opening for the grease;

Fig. 5 is a fragmentary perspective view of one of the raised portions and showing the bacon lifted lying within the mechanism for elevating the same;

Fig. 6 is a transverse sectional view taken through the lower part of the cooking utensil along lines 6—6 of Fig. 3 with illustration made to the manner in which the bacon lifter is elevated; and Fig. 7 is a fragmentary transverse sectional view taken on line 7—7 of Fig. 5 and through one of the raised portions and the bacon lifter therein.

Referring now to the figures, 10 represents a bottom part, into which the bacon and eggs are put and the bottom of which receives heat from the stove. This bottom part 10 is generally of square shape, of low height and as shown in the form of the invention illustrated in Figs. 1 and 2, has a handle projection 11 to which a wood or plastic handle 12 is secured by screws 13. The rear end of the bottom part 10 has a hinge projection 14 to which locks 15 and 16 of a heat resistant transparent cover or lid 17 is connected by a hinge pin 18. While this glass cover 17 may be integral with the projections 15 and 16, it is preferably formed of a frame 19 of metal, such as aluminum, and the front of the frame has an integral handle projection 21 to which a wood or plastic grip 22 is secured by screws 23. This handle grip 22 has a flat bottom face and will be aligned with the handle grip 12 when the lid or cover 17 is closed upon the bottom part. Also, the frame 19 of the cover will engage with the upper edge of the bottom part. The bottom part has four raised portions 24, 25, 26 and 27 on which strips of bacon as indicated at 28, Fig. 2, are placed. When the cover is brought down, the bacon strips 28 will be retained on these raised portions by the underface of the cover and accordingly the bacon strips are prevented from curling while they are cooking. Inasmuch as the cover is transparent, the bacon strips can be observed at all times. The bacon strips will be held tight on the portions and compressed. The raised portions are elevated to a point within the bottom part 10 just short of the thickness of bacon strip from the upper edge of the bottom part.

The raised portions are separated by grease troughs 29, 30 and 31 and the ends of the portions are spaced from the sides of the bottom part 10 to provide channels or troughs 32 and 33. These side channels 32 and 33 are connected at the rear by a transverse trough 34.

In the front of the bottom part 10 is a large low area 35 in which the bacon grease will accumulate so that fried eggs 36 will be simultaneously cooked. The grease will flow from the transverse troughs forwardly down the side channels or troughs 32 and 33 and over the low frying area 35. As soon as the eggs and bacon are cooked to the desired degree, which can be observed at all times through the transparent cover or lid 17, the cover or lid can be elevated, and the bacon and eggs removed. The bacon will have been held tightly against the surfaces of the raised portions and, if not overcooked, will be flat when removed from the bottom part. These bacon strips will have a minimum amount of grease in them.

Referring now more particularly to the form of the invention shown in Figs. 3 to 7, wherein there is provided openings in one side of the bottom part and a slide controlling these openings in order that grease can be dispensed from the bottom part and in which there are provided bacon lifters. According to this form of the invention, the same cover or lid 17 is used. A bottom part 41 is of the same substantial shape as the body part 10 of the form of the invention above described and has a hinge projection 42 at the rear thereof for connection with the projections 15 and 16 of the lid 17. At the front of the part 14 there is a metal handle 43 which has a top hand grip portion 44 and an insulated bottom hand grip 45. Within the bottom part are raised portions 46, 47, 48 and 49 that are spaced by transverse troughs 50, 51 and 52. A rear trough 53 is disposed at the rear of the bottom part 41 and is connected with the low egg frying area 54 by side troughs 55 and 56 which also receive grease from the transverse troughs 50, 51 and 52.

In order that the bottom part 41 can be drained of grease at times when more than enough grease has been accumulated, a drain slide 58 is provided on flange 59 at one side of the bottom part. The flange 59 has two drain openings 60 and 61, the opening 60 to receive grease directly from the side channel or trough 55, and the opening 61 being in the low egg frying area adjacent the forward corner of the bottom part 41.

The drain slide 58 lies in a groove or recess 62 on the outer face of the flange 59 and is held tight against the flange 59 and within the groove by a retaining pin 63 having a head thereon and which extends through an elongated slot 64 in the slide 58 thereby to allow the slide to be adjusted along the flange 59 and at the same time be retained thereagainst. The drain slide 58 has two side spouts 65 and 66 that receive the grease from elongated holes 67 and 68, which, as the slide 58 is adjusted will be aligned respectively with the openings 60 and 61 in the flange 59 of the bottom part. The holes 65 and 68 are preferably so spaced that by one movement of the slide 58 the hole 67 will be aligned with the flange opening 60 and wherein a further movement or extent of movement is required in order to align the slot 68 with the opening 61. In this way, the grease can be dispensed from the slot 60 without being dispensed from the slot 61, and likewise the grease can be dispensed from the slot or opening 61 without being dispensed from the slot opening 60, all of which being dependent upon the extent to which the slide 58 is pulled.

Slide 58 is bent and extends around the forward corner of the bottom part as indicated at 69 and has a forwardly and downwardly bent projection 70 connected by a pin 71 to a trigger 72 pivotally connected to the handle 43 by a pin 73. This trigger 72 is normally urged rearwardly by a compression spring 74 seated in the bottom handle grip 45. Accordingly the trigger 72 can be pulled while the hand is gripping the handle 43 to lift the bottom part and to place it in a pouring position.

In each of the raised portions is a groove 75, rounded on the bottom and at the end as indicated at 75' in order to facilitate the cleaning thereof. In each groove is a bacon lifter 77 having a turned up end 78 adapted to pierce the bacon strip and to hold it against displacement. This turned up end 78 is of the thickness of the bacon and sufficiently short that the end will not be engaged by the bottom surface of the glass lid 17. This lifter 77 has an enlarged portion 79 that is disposed in a slot 80, Fig. 6, and is held by a pin 81 for hinge connection with the raised portion. On the enlarged portion 79 is a side projection 82 that is engaged by cam wedges 83 on a slide 84. The slide 84 lies within a groove 85 in side flange 86. The side flange 86 has a plurality of elongated slots 87, through which portions 88 of the cam projections 83 respectively extend.

When the slide 84 is in the rearward position, the cam projections 83 will be free of the projection 82 so that the bacon lifters 77 can be lifted selectively and independently of one another. When the slide 84 is pulled forwardly the cam projections 83 will engage the projections 82 and will lift the bacon lifters to the elevated position as illustrated in Fig. 6.

The slide 84 extends around the corner of the bottom part and has a forwardly and downwardly extending projection 90 that has an elongated slot 91 through which the pin 71 extends for connection with the trigger 72. The trigger 72 will pull both slides together, or slide 84 can be pulled independently of the slide 58 by the finger extending about the projection 90. The bacon slices will accordingly be elevated, as illustrated in Fig. 6, and can be allowed to drain into the channel 56 and that side of the bottom part 41. Upon release of the projection 90, a compression spring 93 will return the slide 84 to its rearward position. The compression spring 93 is supported on a headed pin projection 94 carried by the forward end of the bottom part 41. As the slide 84 is pulled forwardly, the spring 93 will be compressed against the pin 94 and will return the slide 41 in a position to release the cam projections 83 from the projections 82. The lifters 77 may remain elevated and held by the friction connection in the hinged joint with the bottom part and thereafter returned individually to their lowered positions as new strips of bacon are fastened to them.

It should now be apparent that there has been provided a frying pan for eggs and bacon wherein the bacon is retained on raised portions by the lid itself, and where the lid is transparent so that the bacon strips can be observed at all times. It will also be seen that adequate drainage is provided on the bottom part so that the grease will be delivered to the low area for us in frying eggs.

The excess grease can be easily poured from the bottom part by simply pulling the trigger while grasping the handle and after the bacon has been cooked and the lid raised, the individual bacon slices can be elevated to a raised position to be further drained by pulling the slide either with the trigger or independently of the drain slide.

While various changes may be made in the detail construction, it shall be understood that such changes shall be within the spirit and scope of the present invention, as defined by the appended claims.

What is claimed is:

1. A cooking utensil comprising a bottom part having a peripheral flange and a plurality of longitudinally spaced raised portions with flat surfaces, said flat surfaces adapted to support bacon slices and bacon lifters hingedly connected to the ends of the raised portions and having rearwardly extending handle projections adjacent the peripheral flange, a cam slide connected to the peripheral flange for adjustment therealong, and said slide having cam projections adapted as the slide is moved to engage the respective handle projections of the respective bacon lifters to jointly lift the same.

2. A cooking utensil, as defined in claim 1, and said slide having a projection, said bottom part having a central handle and said projection of the slide being aligned with the central handle whereby upon gripping the handle the slide can be pulled, and spring means cooperating with the slide and carried by the bottom part to return the slide to its initial position.

3. A cooking utensil as defined in claim 2 said peripheral flange of the bottom part having a drain opening, a gate valve slidably adjustable upon the flange and having a projection running coextensively with the cam slide for the bacon lifters and adjacent to the central handle on the bottom part, a trigger pivotally connected to the central handle and depending therefrom, biasing means between the trigger and handle to normally urge the trigger to a rearwardly disposed position, said gate valve connected to the lower end of said trigger for movement with the trigger between open and closed positions of the gate valve, lost motion connection means connected between the projection of the bacon lifter slide and said trigger to allow the operation of the bacon lifter slide independently of the trigger while the trigger is in the rearward position, said lost motion means being ineffective upon said trigger being pulled whereby the gate valve and the bacon lifters can be simultaneously operated at the will of the user of the cooking utensil.

4. A cooking utensil as defined in claim 1, and a cover hinged to the rear of the bottom part and adapted to be brought down onto the peripheral flange of the bottom part to engage bacon slices whereby to hold the same on the raised portions and against the bacon lifters while the bacon is being cooked.

(References on following page)

References Cited in the file of this patent

UNITED STATES PATENTS

| | | |
|---|---|---|
| 468,346 | Johnson | Feb. 9, 1892 |
| 533,655 | Lomax | Feb. 5, 1895 |
| 754,310 | Horine | Mar. 8, 1904 |
| 907,798 | Hauge | Dec. 29, 1908 |
| 1,447,813 | Patrick | Mar. 6, 1923 |
| 1,451,971 | Tocchio | Apr. 17, 1923 |
| 1,706,612 | Jaeger | Mar. 26, 1929 |
| 1,707,532 | Moon | Apr. 2, 1929 |
| 1,783,792 | Isaacson | Dec. 2, 1930 |
| 1,847,703 | Ullman | Mar. 1, 1932 |
| 1,936,551 | Garrison | Nov. 21, 1933 |
| 1,988,087 | Peron | Jan. 15, 1935 |
| 2,023,791 | Samuels | Dec. 10, 1935 |
| 2,057,878 | Callahan | Oct. 20, 1936 |
| 2,088,074 | Voight | July 27, 1937 |
| 2,157,303 | Penrose et al. | May 9, 1939 |
| 2,321,676 | Hennessy | June 15, 1943 |
| 2,362,757 | Lang | Nov. 14, 1944 |
| 2,499,083 | Ashworth et al. | Feb. 28, 1950 |
| 2,579,258 | Heckert | Dec. 18, 1951 |
| 2,589,890 | Stoecker | Mar. 18, 1952 |

FOREIGN PATENTS

| | | |
|---|---|---|
| 218,037 | Switzerland | Oct. 1, 1942 |